United States Patent [19]
Grange et al.

[11] Patent Number: 5,385,516
[45] Date of Patent: Jan. 31, 1995

[54] CONTROL METHOD FOR MANAGING ENGINE TORQUE

[75] Inventors: Jean-Paul Grange, Illkirch Graffenstaden; Olivier Lecomte, Lipsheim, both of France

[73] Assignee: General Motors France, Gennevilliers, France

[21] Appl. No.: 944,625

[22] Filed: Sep. 14, 1992

[30] Foreign Application Priority Data

Dec. 24, 1991 [GB] United Kingdom ............. 9127353

[51] Int. Cl.6 ............................................. F16H 59/14
[52] U.S. Cl. ............................................. 477/107
[58] Field of Search ................. 74/866; 364/424.1

[56] References Cited

U.S. PATENT DOCUMENTS

| | | | |
|---|---|---|---|
| 4,792,902 | 12/1988 | Hrovat et al. | 364/424.1 OR |
| 4,968,999 | 11/1990 | Fodale et al. | 74/866 X |
| 5,021,956 | 6/1991 | Yoshimura et al. | 74/866 X |
| 5,091,854 | 2/1992 | Yoshimura et al. | 364/424.1 OR |
| 5,129,286 | 7/1992 | Nitz et al. | 74/866 X |

FOREIGN PATENT DOCUMENTS

| | | |
|---|---|---|
| 0355070A1 | 2/1990 | European Pat. Off. |
| 2032020A | 4/1980 | United Kingdom . |
| 2196057A | 4/1988 | United Kingdom . |
| 91/13780 | 9/1991 | WIPO . |

*Primary Examiner*—Dirk Wright
*Attorney, Agent, or Firm*—Mark A. Navarre; Michael J. Bridges

[57] ABSTRACT

Engine torque is managed, particularly during a gear change, so as to improve comfort and reduce wear of the engine and components associated therewith. A transmission control module is adapted to determine start and end times for torque management on the basis of a plurality of look-up tables stored in memory which are accessed via one or more engine operating parameters determined from a plurality of sensors. The contents of the look-up tables are determined experimentally to give the most appropriate start and end times for the given conditions, and not on the basis of any mathematical formula.

13 Claims, 6 Drawing Sheets

CONTROL METHOD FOR MANAGING ENGINE TORQUE

BACKGROUND OF THE INVENTION

The present invention relates to a method for controlling engine torque for use, for example, during a gear changing operation in a vehicle.

It is known, particularly for automatic and semi-automatic transmissions, to control the engine torque when the transmission is changing from one gear to another in order to improve the comfort for the driver and passengers of the vehicle.

One example of a method of controlling engine torque in an automatic transmission is shown in EP-A-0,355,070, in which the engine torque is reduced during a period of the gear change. The start and end times of this control period are determined from mathematical formulae which are based on the engine speed at particular points in the gear change. A problem with this type of torque control is that the mathematical formulae do not give the best results over the whole range of gear changes.

SUMMARY OF THE PRESENT INVENTION

The present invention seeks to provide an improved method for controlling the torque of an engine.

According to an aspect of the present invention, there is provided a method of managing the torque of an engine during a gear change, comprising the steps of determining the type of gear change; measuring one or more engine operating parameters during the gear change; obtaining one or more values for determining the start and/or end of torque management from a storage medium on the basis of the type of gear change and the measured operating parameter or parameters, each of the values in the storage medium being chosen experimentally as providing substantially the most appropriate start and/or end time for torque management from the particular engine operating parameter or parameters associated therewith; and managing the engine torque between the determined start and/or end times.

The values in the storage medium are preferably adapted to reduce torque during a gear change caused by disengagement and engagement of gears.

It has been found that using values of this type, which are preferably each determined on an individual basis by experiment, it is possible to provide the best gear change for all measured conditions. Thus, by ensuring that the gear change is as smooth as possible for all such conditions, not only can passenger comfort be increased, but also wear of the transmission can be reduced and thus the life thereof increased.

In the preferred embodiment, during an upshift, an upshift start value for determining the start of torque management during an upshift is obtained from a look-up table in the storage medium on the basis of throttle position, and torque management is started when the engine speed is less than the difference between a maximum engine speed occurring during the gear change and the upshift start value. Preferably, the method comprises the step of starting torque management if the engine speed has not fallen below the difference between the maximum engine speed and the upshift start value within a predetermined start time.

Thus, torque management can be made to start at the most appropriate time for the measured vehicle operating parameters, with a back-up facility of starting torque management in any event after a predetermined time if the engine speed does not reach the required value.

Preferably, the start time is measured from a predetermined time after commencement of the gear change. This predetermined time is usually around 20% to 35% of the total time for the gear change, and it has been found that this provides the best point from which to determine the start and end times for torque control.

Similarly, during an upshift, an upshift end value for determining the end of torque management is preferably obtained from a look-up table in the storage medium on the basis of a maximum engine speed occurring during the gear change, and torque management is ended when the engine speed is less than the upshift end value. The method may comprise the step of ending torque management if the engine speed has not fallen below the upshift end value within a predetermined end time. Advantageously, the end time is measured from a predetermined time after commencement of the torque management.

On the other hand, during a downshift, a first reference engine speed for determining the start of torque management is preferably obtained from a look-up table in the storage medium on the basis of the transmission output speed at a predetermined point during the gear change, and torque management is started when the engine speed is greater than the first reference speed.

It has been found that determining the start and end times for a downshift on the basis of the transmission output speed provides the best results.

Thus, during a downshift, a second reference engine speed for determining the end of torque management may be obtained from a look-up table in the storage medium on the basis of the transmission output speed at a predetermined point during the gear change, and torque management is ended when the engine speed is greater than the second reference speed.

In a similar manner, as with the upshift, the method may comprise the step of ending torque management if the engine speed has not become greater than the second reference speed within a predetermined end time. This is a useful back-up facility if the engine speed never reaches the required speed.

The method may also comprise the step of inhibiting the end of torque management until a predetermined period has elapsed from the start of torque management. This can ensure that torque management is not ended before the end of the gear change.

Preferably, the engine torque is returned gradually to the torque associated with the detected engine operating conditions when a gear change is not in progress. This can prevent a sudden, unwelcome, increase in engine torque after the gear change.

According to another aspect of the present invention, there is provided apparatus for managing the torque of an engine during a gear change, comprising detection means adapted to determine the type of gear change required; sensing means adapted to measure one or more engine operating parameters during the gear change; a storage medium for storing a plurality of values for use in determining the start and/or end of torque management, each of the values being chosen experimentally as providing substantially the most appropriate start and/or end time for torque management for the engine operating parameter or parameters associated therewith; processing means adapted to obtain one or more values from the storage medium on the basis of the type of gear change and the measured operating parameter or parameters and to determine the start and/or end times for torque management; and means for controlling the engine torque between the determined start and/or end times.

In the following description, the term "upshift" is used to denote a gear change from a lower gear to a higher gear (such as from first to second), while the term "downshift" is used to denote a gear change from a higher gear to a lower gear (such as from second to first).

An embodiment of the present invention is described below, by way of illustration only, with reference to the accompanying drawings.

DETAILED DESCRIPTION OF THE INVENTION

Figure 1:
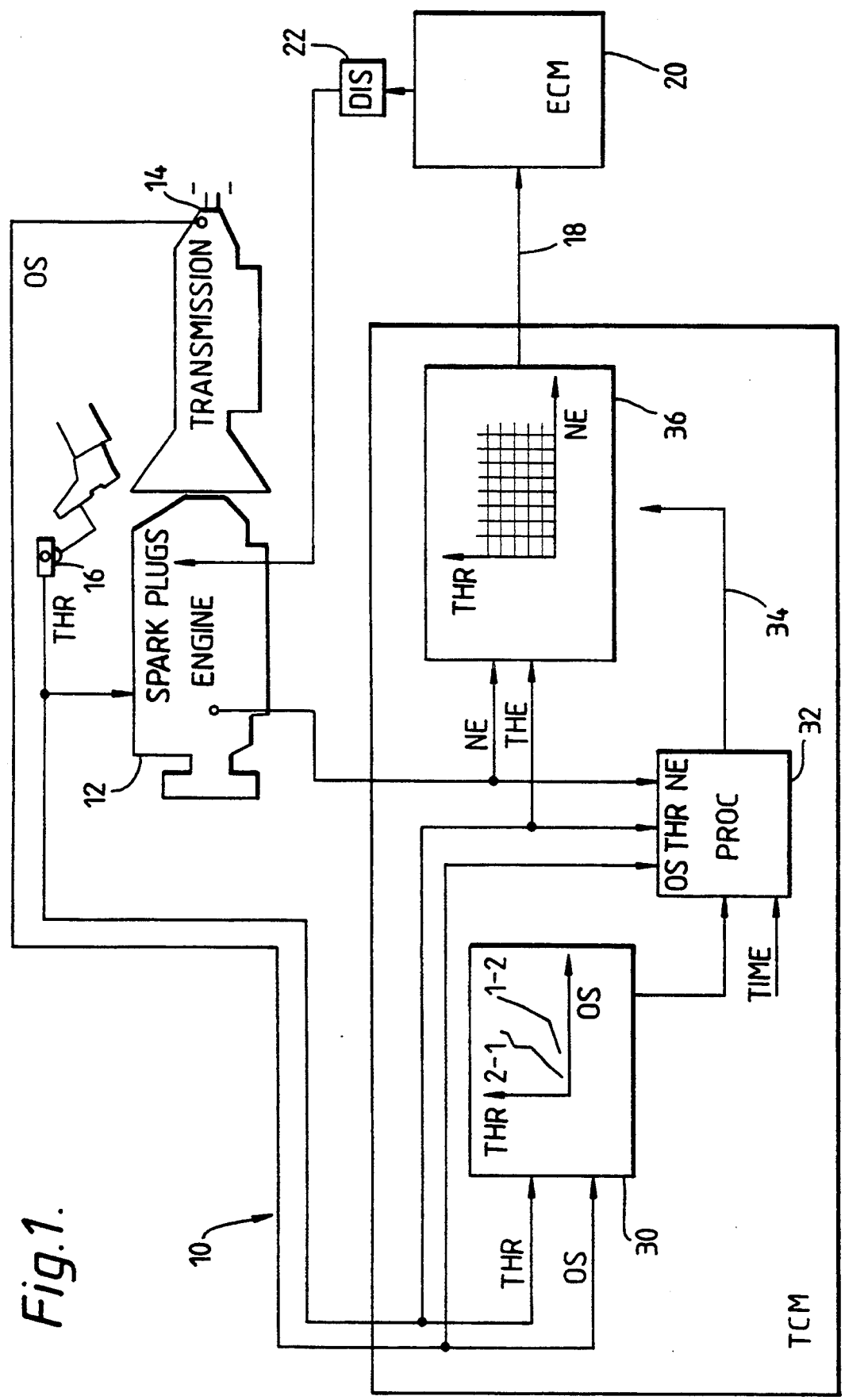
FIG. 1 is a block diagram of a control system according to this invention, including a transmission control module TCM.

Referring to FIG. 1, a transmission control module (TCM) 10 adapted to manage engine torque during gear changes is connected to an engine speed sensor (not shown) disposed to measure the speed of the engine 12, to an output speed sensor (not shown) disposed to measure the output speed of the transmission 14, and also to a throttle position sensor (not shown) adapted to measure the position of the throttle 16.

An output 18 of the transmission control module 10 is connected to the engine control module (ECM) 20 of the vehicle for supplying a replacement spark advance signal to the engine control module 20, as is described in further detail below.

The engine control module 20, which is of any suitable form, is connected to the engine spark plugs through the distributor 22.

FIG. 1 also shows the principal components of the transmission control module 10. These include a detection unit 30 which is connected to the throttle position sensor and the transmission output speed sensor, and which is adapted to determine on the basis of the signals from these sensors whether it is appropriate to change gear, and if so, what the change should be. In use, the signals from these sensors are used to access a look-up table which gives an indication of the appropriate gear for the measured conditions, and therefore whether it is appropriate to change gear.

A processing unit (PROS) 32 is connected to the output of the detection unit 30, and also to the signals from the transmission output speed sensor, the throttle position sensor and the engine speed sensor. In use, when the detection unit determines that a change in gears is necessary, it sends an enable signal to the processing unit 32. The processing unit 32 then determines the start and end times for torque management, by accessing a plurality of look-up tables (not shown) by means of one or more of the signals it receives from the various sensors, described in further detail below.

Spark advance unit 36 is connected to an output of the processing unit 32 in such a manner that the spark advance unit 36 is enabled by an appropriate signal output on line 34 by the processing unit 32 during the determined start and end times for torque management.

When so enabled, the spark advance unit 36 determines a replacement absolute spark advance from one or more look-up tables, which are described in further detail below, on the basis of the engine speed (NE) and the throttle position (THR), and sends the replacement spark advance to the engine control module 20 on output line 18. This process is repeated every 25 milliseconds, while it is enabled by the processing unit 32, thereby sending an updated spark advance to the engine control module 20 every 25 milliseconds.

The replacement spark advance value sent to the ECM 20 is adapted to replace the spark advance calculated by the engine control module 20.

The line 18 connecting the output of the spark advance unit 36 to the engine control module 20 may be a simple wire connection. Alternatively, it may be a serial connection, in which case, a signal indicative of the obtained spark advance is sent together with various identification codes and status codes of conventional type.

The operation of the transmission control module 10 during a gear change will become apparent from the following description.

Figure 2:
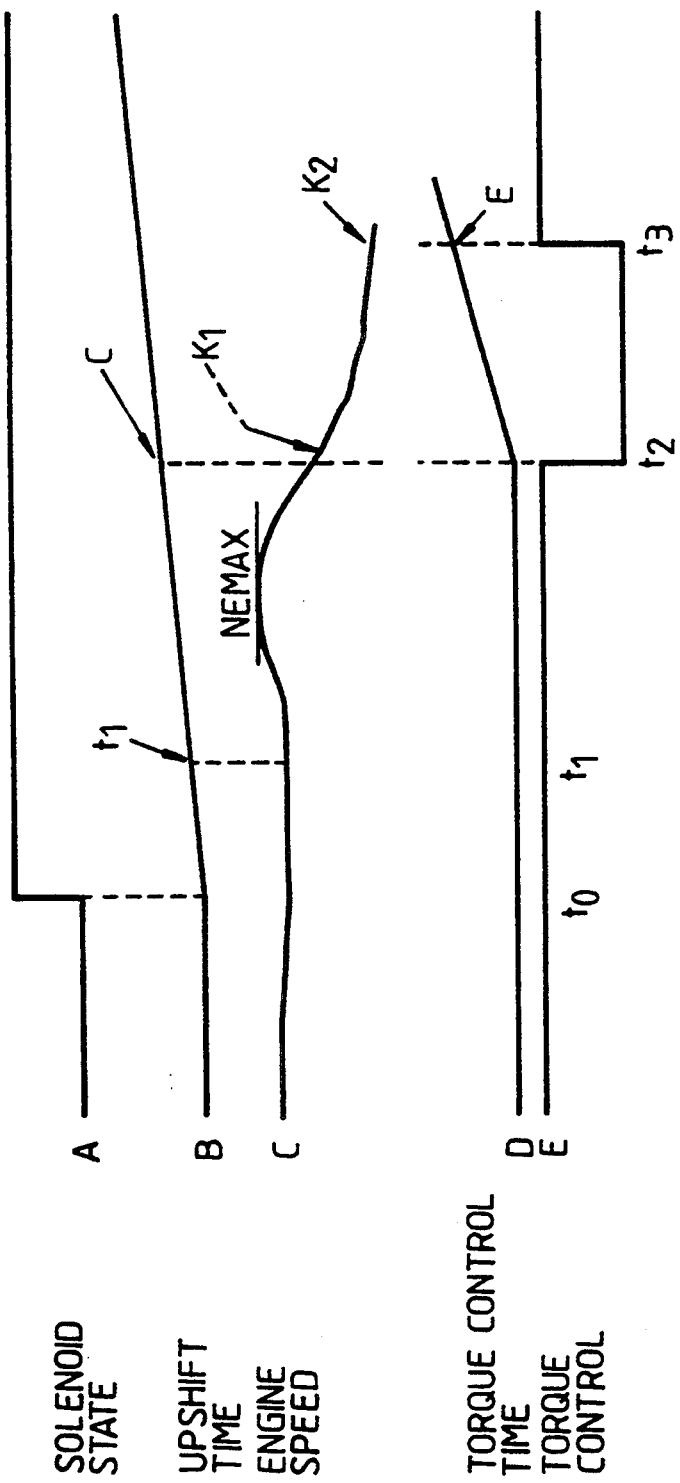
FIG. 2 is a series of graphs of engine operating parameters vs. time for an upshift.

The effect of an upshift on the engine speed can be seen in FIG. 2. Referring to trace A, at time $t_0$ the transmission control module 10, having determined from the transmission output speed (OS) and the throttle position (THR) that a higher gear should be engaged, causes a change in the state of a transmission shift valve solenoid. The change of state of the solenoid initiates the gear change, by initiating disengagement of the engaged gear or gears and engagement of a new gear or gears.

As the gear change progresses, the engine speed NE alters in the manner shown in trace C. As can be seen, after a delay, the engine speed rises to a maximum value $NE_{max}$ and then falls steadily until it reaches the speed appropriate to the new gear ratio.

At a time $t_2$, the transmission control module 10 sends a replacement spark advance signal to the engine control module so as to reduce the engine torque, and continues sending such a signal until a time $t_3$, which is approximately at the end of the gear change. At time $t_3$, the transmission control module 10 ceases to send a replacement spark advance signal, and thereby enables the engine control module 20 to output the normal spark advance to the distributor 22. This increases the engine torque up to its normal value. Time $t_3$ is usually no more than around 2 seconds after the change in the state of the solenoid ($t_0$).

The times for the start and end of torque management are determined from the engine speed (NE) measured at a time $t_1$ after the change in the solenoid state. This time $t_1$ is preferably around 0.3 to 0.5 seconds from $t_0$, and normally around 20 to 35% of the total time taken for the gear change. It has been found that torque management can be significantly more effective if it is based on the engine speed after such a delay than at any other time in the gear change.

The time $t_2$ at which torque management starts is chosen as being either the time when the engine speed has decreased by more than a determined amount from the maximum engine speed measured after $t_1$ or a predetermined time after the change in the state of the solenoid, whichever is the first to occur. In other words, torque management commences when:

$$NE < NE_{max} - K_1(THR)$$

or $$T_{t0} > C$$

where NE is the measured engine speed, $NE_{max}$ is the maximum engine speed measured after $t_1$, $K_1(THR)$ is an amount determined as a function of throttle position, $T_{t0}$ is time elapsed from $t_0$ and C is a predetermined amount which is preferably around 1.2 to 1.6 seconds, depending of the type of the gear change The amount $K_1(THR)$ is obtained from one of the look-up tables associated with the transmission control module 10 on the basis of throttle position, in other words, of engine load. The look-up table is arranged so as to have a predetermined number of values for $K_1(THR)$ for each type of gear change, such that one of these values is selected in dependence upon the throttle position and the type of the gear change. Each value in the look-up table is determined on the basis of experimental tests and is the value which gives the most comfortable gear change under the particular conditions. The value for $K_1(THR)$ is therefore generally not based on any particular mathematical formula.

Once torque management has begun at time $t_2$, the transmission control module 10 sends a replacement spark advance signal to the engine control module 20, which is obtained from a three-dimensional look-up table on the basis of the throttle position (THR) and the engine speed (NE). The replacement spark advance signal is retarded relative to the spark advance which is used during normal running of the engine so that the torque of the engine is reduced during the gear change. The actual amount of retardation is determined on the basis of experimental tests and is intended to give the smoothest gear change.

Torque management ends at time $t_3$, either when the engine speed has fallen below a predetermined speed or when the time from the start of torque management exceeds a predetermined time, whichever is the first to occur. In other words, torque management ends when:

$$NE < K_2(NE_{max})$$

or $$T_{t2} > E$$

where $K_2(NE_{max})$ is a value of engine speed which is obtained from a look-up table on the basis of the maximum engine speed $NE_{max}$ and the type of the gear change; and E is a predetermined time which in this embodiment is around one third of a second (usually around 15 to 20% of the total time taken for the gear change).

$K_2(NE_{max})$, as with $K_1(THR)$, is obtained from one of the look-up tables associated with the transmission control module 10 on the basis of the maximum engine speed $NE_{max}$ occurring during the gear change. The look-up table is arranged so as to have a predetermined number of values for $K_2(NE_{max})$ for each type of gear change such that one of these values is selected in dependence upon the maximum engine speed $NE_{max}$ and the type of the gear change. The values for $K_2(NE_{max})$ are determined, as with those for $K_1(THR)$ on the basis of experimental tests to give the most comfortable gear change.

The start and end times for torque management during an upshift can thus be made to correspond to the best times on the basis of experimental tests, with the back-up facility of forcing commencement and ending of torque management at preset maximum times (C,E) should the speed-based conditions not be met.

The terms given in the above equations can be seen in the traces of FIG. 2, in particular in traces B, C, and D.

Figure 3:
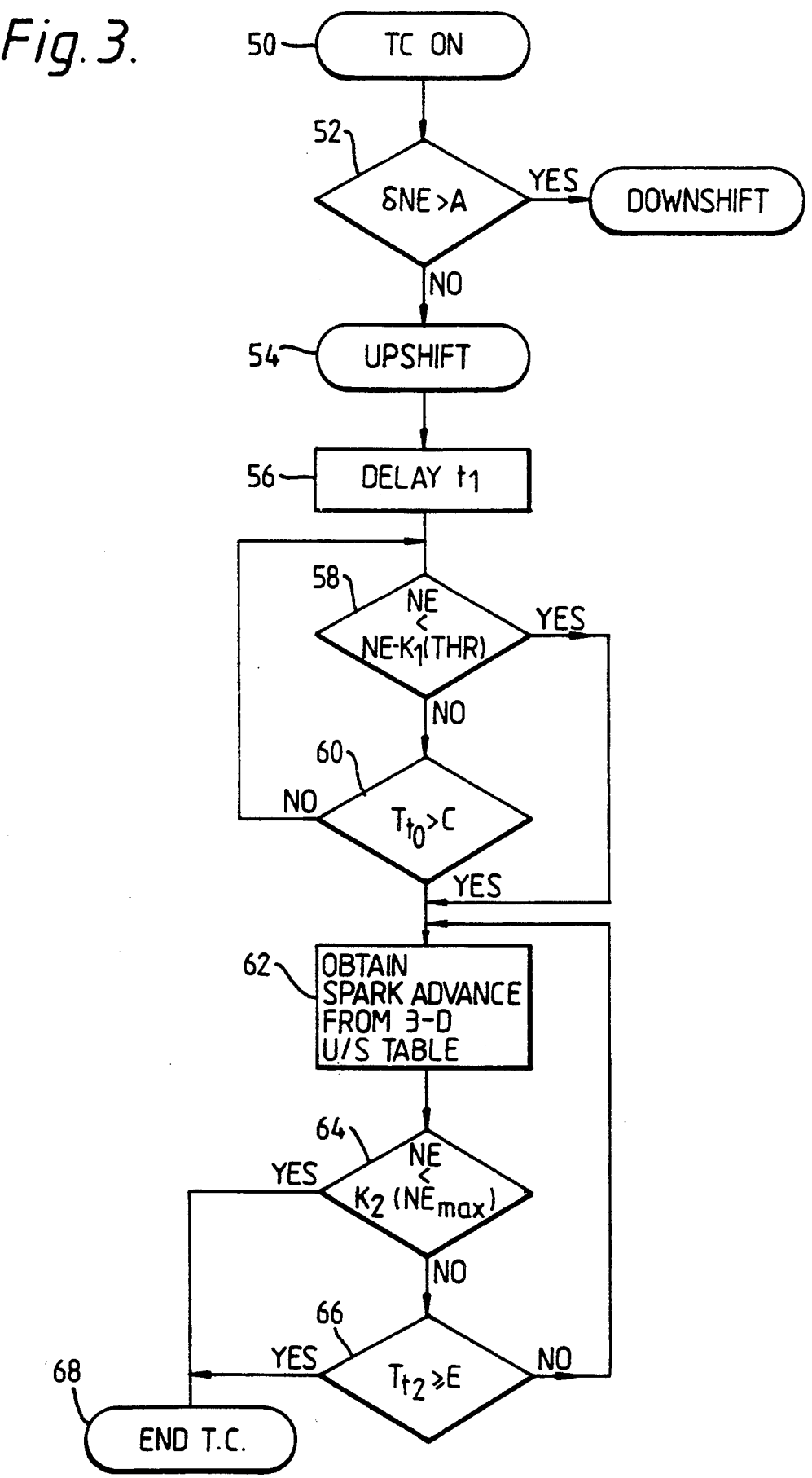
FIG. 3 is a flow chart of a TCM control routine corresponding to the graphs of FIG. 2.

An example of routine for carrying out the above-described upshift process is shown in FIG. 3.

The routine commences at step 50 at which the transmission control module 10 sends a signal to the engine control module 20 representative of the change in the solenoid state, and hence of the commencement of the gear change. On receipt of this signal, the engine control module 20 measures the change in engine speed $\Delta NE$ over a preset period. If the change is greater than a preset amount A, it determines at step 52 that the shift is a downshift, and if this is not the case, it determines that the shift is an upshift.

The upshift routine 54 carried out by the transmission control module 10 first measures a delay $t_1$ at step 56 and then proceeds to step 58 in which it obtains the value $K_1(THR)$ from the associated look-up table on the basis of the throttle position and determines if the engine speed is less than $NE_{max}$ by more than the value $K_1$. If this is the case, the routine by-passes step 60 and moves to step 62.

However, if the test at step 58 is negative, the routine proceeds to step 60 in which it determines whether the time $T_{t0}$ elapsed from $t_0$ is greater than the predetermined amount C. If this test is positive, the routine proceeds to step 62, while if it is negative, the routine returns again to step 58.

At step 62, the routine obtains the absolute spark advance from a look-up table on the basis of the measured throttle position and engine speed. It then continues to steps 64 and 66 to determine if the end of the torque management period has been reached. At step 64, the routine obtains the engine speed value $K_2(NE_{max})$ from a look-up table on the basis of the maximum engine speed occurring after $t_1$ and determines if the engine speed is below this value. If this is the case, the routine proceeds to step 68 to end torque management, and hence to return the spark advance to its normal value. However, if this is not the case, the routine proceeds to step 66 at which it determines whether the time $T_{t2}$ elapsed from $t_2$ has reached or exceeds the predetermined time E, and if so, proceeds to step 68 to end torque management. However, if the time $T_{t2}$ is less than E, the routine returns to step 62.

Figure 4:
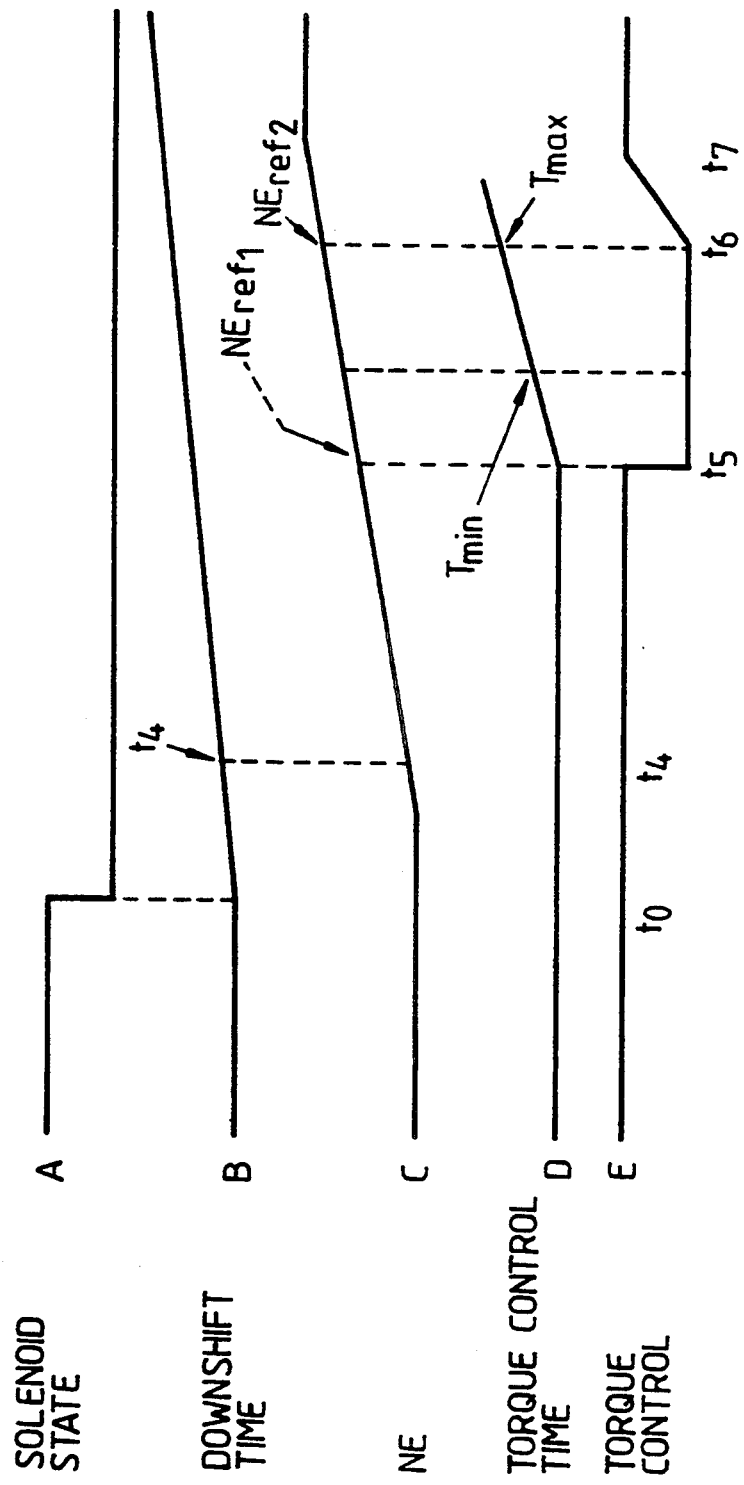
FIG. 4 is a series of graphs of engine operating parameters vs. time for a downshift.

Considering next the situation during a downshift, when the transmission control module 10 determines that a lower gear should be engaged, it changes the state of the transmission solenoid, thereby initiating the downshift. As shown in FIG. 4, this change occurs at time $t_0$.

As can be seen from trace C of FIG. 4, the engine speed (NE) will rise gradually during the downshift from a short time after the change in the state of the solenoid.

A delay $t_4$ is allowed to elapse before the transmission control module 10 begins its determination of the start and end times for torque management. This delay, in a similar manner to the delay $t_1$ for an upshift, is preferably around 20 to 25% of the total time taken for the gear change, and ensures that the transmission output speed used in determining the start and end times for torque management is appropriate for giving the most comfortable gear change.

The transmission control module 10 commences torque management at time $t_5$, when the engine speed becomes greater than a first reference engine speed, determined as a function of the transmission output speed measured repeatedly, preferably every 25 milliseconds, after the delay $t_4$. In other words, torque management starts when:

$$NE > NE_{ref1}(OS),$$

where $NE_{ref1}(OS)$ is a first reference engine speed obtained from a look-up table on the basis of both the current transmission output speed (OS) and the type of gear change. The look-up table is arranged so as to have a predetermined number of values for $NE_{ref1}(OS)$ for each type of gear change such that one of these values is selected every period, i.e. every 25 milliseconds, in the preferred embodiment, in dependence upon the transmission output speed measured each period and on the type of the gear change. The values for $NE_{ref1}(OS)$ are chosen, as with those for $K_1(THR)$ and $K_2(NE_{max})$, on the basis of experimental tests to give the most comfortable gear change.

During the period of torque management, the replacement absolute spark advance is obtained from a three dimensional look-up table on the basis of the throttle position (THR) and engine speed (NE). The three-dimensional look-up table is similar in lay-out to the look-up table for the upshift routine.

The end of the period for torque management, at time $t_6$, is determined when a preset minimum time $T_{min}$ has elapsed from the start of torque management at $t_5$ and either the engine speed has increased to above a second reference speed $NE_{ref2}(OS)$ or the time elapsed from time $t_5$ has reached or is greater than a predetermined amount, whichever is the first to occur. In other words, torque management ends when:

$$T_{t5} >= T_{min}$$

and either $$NE > NE_{ref2}(OS)$$

or $$T_{t5} >= T_{max}$$

where $T_{t5}$ is the time elapsed from time $t_5$, $T_{min}$ is a preset minimum time, $NE_{ref2}(OS)$ is a reference speed determined repeatedly, in a similar manner to the first reference speed $NE_{ref1}(OS)$, on the basis of the current transmission output speed measured every period, and $T_{max}$ is a preset maximum time for the duration of torque management. In the preferred embodiment, $T_{max}$ is around one twentieth of a second, while $T_{min}$ is any suitable value obtainable by experiment.

The value for $NE_{ref2}(OS)$ is obtained every period from a look-up table on the basis of the current transmission output speed measured each period and the type of gear change. The values are determined by experimental tests and are adapted to provide the most comfortable gear change.

Once it has been determined that torque management is to end, the spark advance is gradually increased over a period from $t_6$ to $t_7$, which is preferably of the order of a fifth of a second, determined by experiment, and is intended to provide a smooth increase in torque. Of course, an alternative way of increasing the engine torque after torque management would be to increase the spark advance by a predetermined amount per unit time and to have a variable end time $t_7$.

As with the upshift, the start and end times for torque management during a downshift can be made to correspond to the best times on the basis of experimental tests, with the back-up facility of ending torque management at a preset maximum time ($T_{max}$) should the conditions of step 80 not be met. It has been found that it is not necessary to have a time limit for the start of the downshift if the engine speed never reaches the second reference speed $NE_{ref2}$ since, if this condition is not met, it will not be necessary to carry out a gear change, and if no change is made, there is no risk of damaging the engine by causing it to run at too high a speed.

The terms described above can be seen in FIG. 4, particularly in traces B, C and D.

Figure 5:
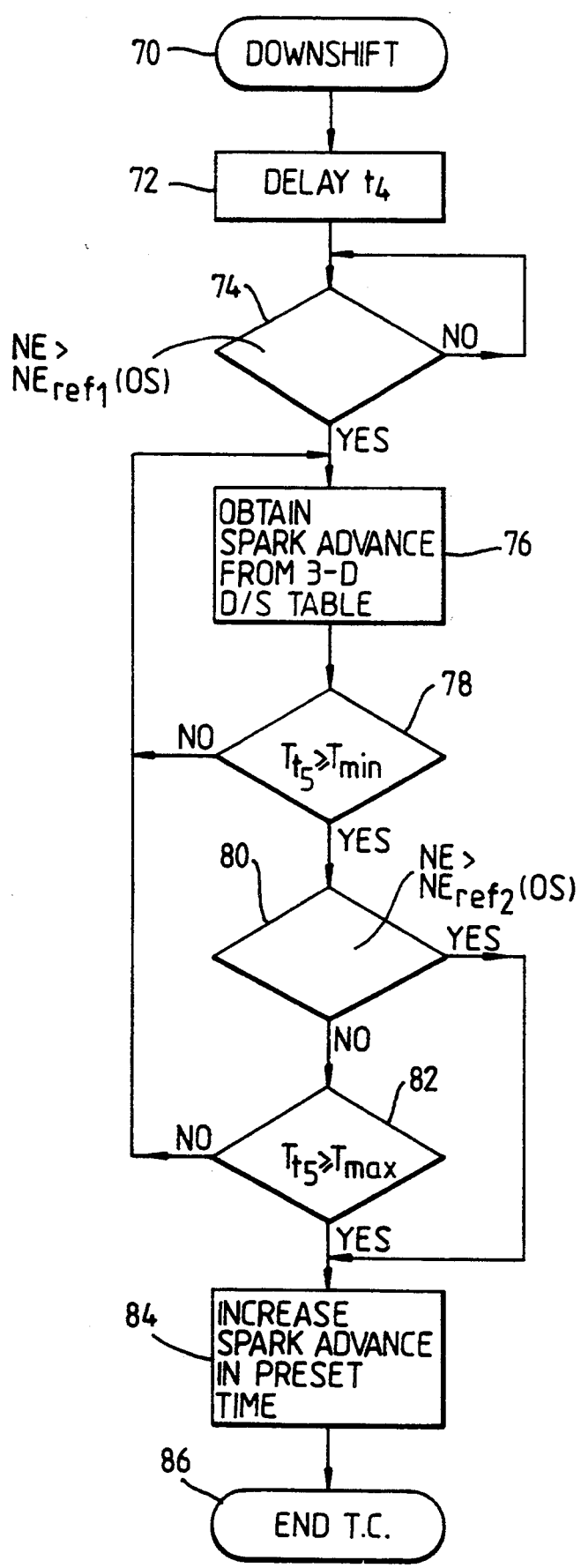
FIG. 5 is a flow chart of a TCM control routine corresponding to the graphs of FIG. 4.

An example of routine for carrying out the downshift process described above is given in FIG. 5.

When the routine at step 52 of FIG. 3 determines that the change in engine speed is greater than the preset value A, and hence that the gear change is a downshift, it proceeds to step 72 in which it provides the delay $t_4$.

After the delay $t_4$, the routine obtains at step 74 the first reference engine speed $NE_{ref1}(OS)$ and determines whether the engine speed is greater than $NE_{ref1}$. If this is not the case, the routine returns to step 74 to find a new value for $NE_{ref1}$ from the newly measured value of the output speed. However, if the test is positive, the routine proceeds to step 76 at which it obtains a replacement spark advance from the appropriate three-dimensional look-up table on the basis of the measured throttle position and engine speed. As with torque management during an upshift, the replacement spark advance values are retarded relative to the normal spark advance which is used during normal running of the engine so as to reduce the torque of the engine during the gear change. The amounts of retardation are determined by experiment as being those which give the most comfortable gear change.

At step 78, the routine determines if the time $T_{t5}$ elapsed from $t_5$ is greater than the minimum time $T_{min}$, and if this is not the case it returns to step 76 again. However, if the minimum time has elapsed, the routine proceeds to steps 80 and 82 to determine whether torque management should end.

In step 80, the routine measures the current output speed, obtains the second reference speed $NE_{ref2}(OS)$ from the appropriate look-up table on the basis of the current transmission output speed and then determines if the engine speed is greater than $NE_{ref2}$. If so, the routine by-passes step 82 to step 84 to end torque management. However, if the test is negative, the routine determines, at step 82, if the time $T_{t5}$ elapsed from the start of torque management is greater than or equal to the maximum time $T_{max}$ and, if so, proceeds to step 84. However, if the maximum time $T_{max}$ has not been reached, the routine returns to step 76 on the basis that the gear change is still in progress.

At step 84, the spark advance is gradually increased over the preset time period from $t_6$ to $t_7$, and when this has been completed, the routine proceeds to step 86 at which torque management is ended.

Figure 6:
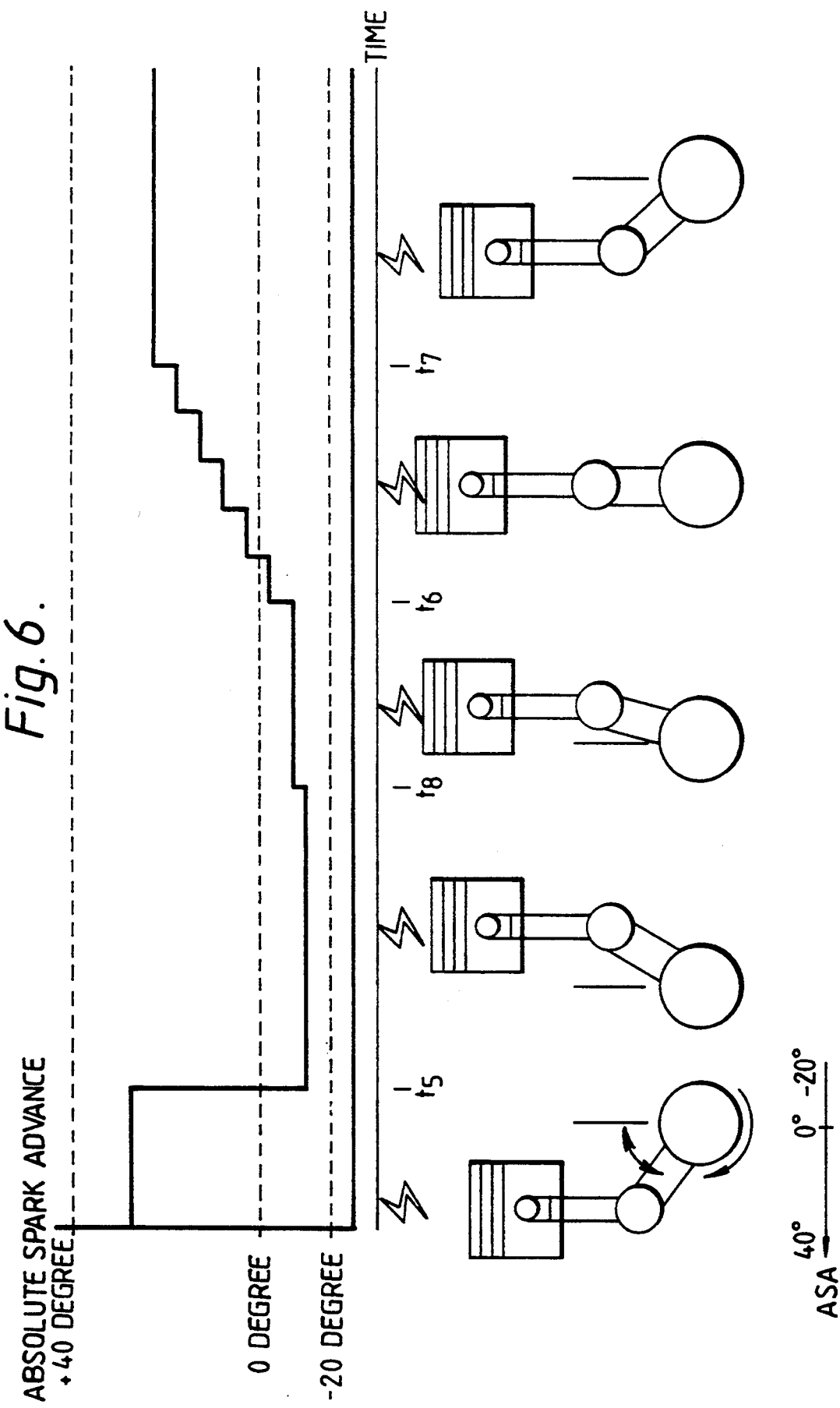
FIG. 6 is a schematic diagram illustrating the effect of the control routine of FIG. 5 during a downshift.

The effect of torque management during a downshift is shown schematically in FIG. 6. During normal running of the engine, the spark advance is shown as being around 30° before top dead center. At the start of torque management at time $t_5$, the spark advance is retarded from the normal position, so that ignition takes place around 20° after top dead center in the example shown. The amount of retardation, in other words the replacement spark advance, determined on the basis of the throttle position and engine speed, is reduced between times $t_8$ and $t_6$ due to a change in engine operating conditions. From time $t_6$, the timing of ignition is gradually advanced back to the normal ignition time for the measured conditions.

In the preferred embodiment, the three-dimensional tables used to determine the modified spark advance for each of the three described types of shift are different, although it would be possible to have a single table for all of the types of gear change.

The embodiments of the invention in which an exclusive property or privilege is claimed are defined as follows:

1. A method of managing engine torque during a transmission gear change, comprising the steps of:
   determining a type of gear change;
   measuring an engine operating parameter during the gear change;
   determining a time of torque management in relation to at least one value obtained from a storage medium based on the type of gear change and the measured engine operating parameter, the at least one value in the storage medium being chosen experimentally to provide substantially a most appropriate time for torque management;
   when the determined type of gear change is an upshift, obtaining an upshift start value for determining initiation of torque management from a lookup table in the storage medium based on engine throttle position and initiating torque management when a measured engine speed is less than the difference between the maximum engine speed occurring during the upshift and the upshift start value; and
   managing engine torque during the determined time of torque management.

2. A method according to claim 1 comprising the step of initiating torque management if the measured engine speed has not fallen below the difference between the maximum engine speed and the upshift start value within a predetermined start time.

3. A method according to claim 2 wherein said start time is defined with respect to a commencement of the upshift.

4. A method of managing engine torque during a transmission gear change, comprising the steps of:
   determining a type of gear change;
   measuring an engine operating parameter during the gear change;
   determining a time of torque management in relation to at least one value obtained from a storage medium based on the type of gear change and the measured engine operating parameter, the at least one value in the storage medium being chosen experimentally to provide substantially a most appropriate time for torque management;
   when the determined type of gear change is an upshift, obtaining an upshift end value for determining a termination of torque management from a lookup table in the storage medium based on a maximum engine speed occurring during the upshift, and terminating torque management when a measured engine speed is less than the upshift end value; and
   managing the engine torque during the determined time of torque management.

5. A method according to claim 4 comprising the step of terminating torque management if the measured engine speed has not fallen below the upshift end value within a predetermined end time.

6. A method according to claim 5, wherein said end time is defined with respect to a commencement of the upshift.

7. A method of managing engine torque during a transmission gear change, comprising the steps of:
   determining a type of gear change;
   measuring an engine operating parameter during the gear change;
   determining a time of torque management in relation to at least one value obtained from a storage medium based on the type of gear change and the measured engine operating parameter, the at least one value in the storage medium being chosen experimentally to provide substantially a most appropriate time for torque management;
   when the determined type of gear change is a downshift, obtaining a downshift start speed during the downshift for determining initiation of torque management from a lookup table in the storage medium based on a transmission output speed, and initiating torque management when a measured engine speed is greater than the downshift start speed;
   and managing the engine torque during the determined time of torque management.

8. A method of managing engine torque during a transmission gear change, comprising the steps of:
   determining a type of gear change;
   measuring an engine operating parameter during the gear change;
   determining a time of torque management in relation to at least one value obtained from a storage medium based on the type of gear change and the measured engine operating parameter, the at least one value in the storage medium being chosen experimentally to provide substantially a most appropriate time for torque management;
   when the determined type of gear change is a downshift, obtaining a downshift end speed for determining a termination of torque management from a lookup table in the storage medium based on a transmission output speed, and terminating torque management when a measured engine speed is greater than the downshift end speed; and
   managing engine torque during the determined time of torque management.

9. A method according to claim 8, comprising the step of terminating torque management if the measured engine speed has not become greater than the downshift end speed within a predetermined end time.

10. A method according to claim 8, comprising the step of inhibiting the termination of torque management until a predetermined period has elapsed from an initiation of torque management.

11. A method of managing engine torque during a transmission gear change, comprising the steps of:
   determining a type of gear change;
   measuring an engine operating parameter during the gear change;
   determining a time of torque management in relation to at least one value obtained from a storage medium based on the type of gear change and the measured engine operating parameter, the at least one value in the storage medium being chosen experimentally to provide substantially a most appropriate time for torque management;
   managing the engine torque during the determined time of torque management; and
   when a gear change is not in progress, returning the engine torque gradually to a torque associated with the measured engine operating parameters at a termination of torque management.

12. A method according to claim 8, wherein said transmission output speed is measured a predetermined time after commencement of the downshift.

13. A method according to claim 7, wherein said transmission output speed is measured a predetermined time after commencement of the downshift.

* * * * *